Figure 1:
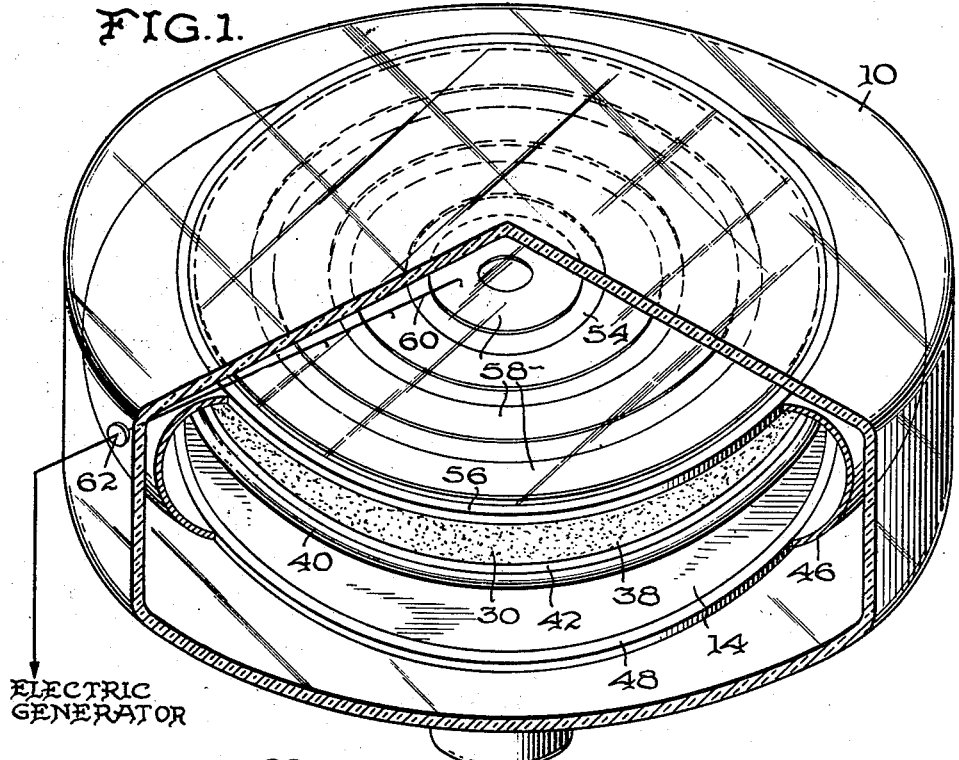

Oct. 8, 1957  L. A. SHANAFELT  2,809,324
ELECTRONIC DEVICE
Filed Sept. 12, 1955  2 Sheets-Sheet 1

INVENTOR.
LEO A. SHANAFELT
BY
ATTORNEY

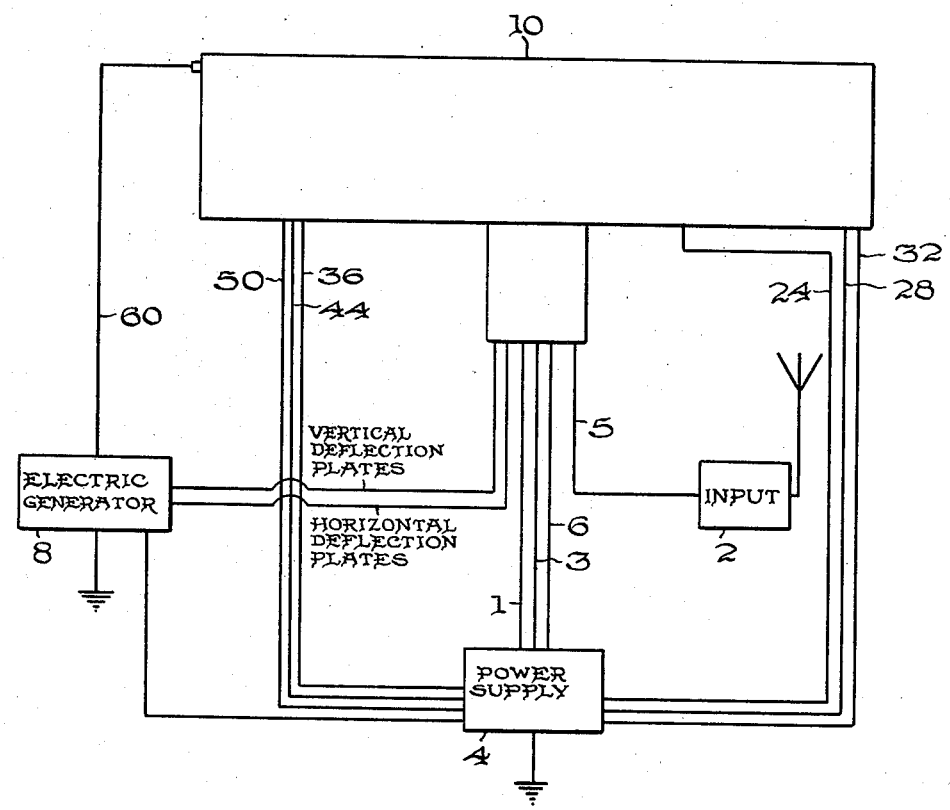

__United States Patent Office__

2,809,324
Patented Oct. 8, 1957

2,809,324

ELECTRONIC DEVICE

Leo A. Shanafelt, Los Altos, Calif., assignor to Kaiser Aircraft & Electronics Corporation, Oakland, Calif., a corporation of New York Application September 12, 1955, Serial No. 533,705

8 Claims. (Cl. 315—21)

This invention relates to a cathode ray tube and more particularly to a polar coordinate cathode ray tube structure capable of exhibiting an image presentation in color.

A polar coordinate tube type cathode ray tube structure as known in the art has particular application in its use as a so-called memory or storage tube. In such use, the tube is primarily adapted to store a clear, distinct image from one scan to another, whereby it is possible to simultaneously visually compare several sets of signals on the target. Storage tubes have been particularly successful in their use in electronic navigational aids for pilots (aircraft cockpit weather mapping), television film conversion, radar scan conversion, digital and analog computers, moving target indication radar and band weight reduction.

Many of these applications require a tube which is of small, compact structure. A particular example of such problem is evidenced in the utilization of such a tube provision of electronic navigational aids for aircraft use.

The advent of radar navigational systems for use in aircraft has brought about a tremendous number of advantages enabling the pilot to be visually cognizant of objects in the region of the aircraft, such as mountains, other aircraft, and prominent structures. Among the ever present problems in the present high velocity aircraft is the combination of the necessary navigational equipment components. The design of the present day high velocity aircraft is dictated by the physics of aerodynamics which demand exceedingly smaller cross-sectional contours in order to obtain the required streamlining for decreasing the wind resistance or drag, thereby increasing the potential velocity of the aircraft. Manifestly, the decrease in the cross-sectional dimensions of the aircraft has necessitated that the equipment for operating and navigating the aircraft be positioned within a correspondingly more compact area.

The conventional cathode ray tube utilized in conventional radar systems for navigation has presented a rather insurmountable problem. In order to reduce the longitudinal dimensions of the tube, a corresponding reduction must be made in the diameter of the fluorescent viewing area of the tube. Attempts have been made in the prior art to reduce the length of the dimension from the electron gun to the fluorescent image screen in an effort to decrease the overall space requirements for the conventional cathode ray tubes. However, one of the problems introduced thereby is the fact that in decreasing the gun-to-screen dimension, it became necessary to curve the image screen so that the length travel of the electrons from their source to the various portions of the screen would be substantially equal throughout the entire scanning procedure in order to present an undistorted representation on the screen. Manifestly, if a very large image screen were required, it would have to be curved a considerable amount, thereby resulting in a tube shape of awkward cumbersome configuration.

With the knowledge of these disadvantages, the inventor has produced a polar coordinate cathode ray tube capable of color presentation which has overall dimensions considerably smaller than the dimensions of the known types of cathode ray tubes, yet is still capable of energizing an equally large image screen as utilized by the conventional tube.

Color is a most satisfactory method of conveying more information to air traffic controllers and other persons involved in air navigation than is possible with ordinary black and white cathode ray tubes used in radar type systems. One employment of polychrome presentation would be to display aircraft positions in various colors, such as, for example, red and green. The significance of the red and green aircraft designation, as represented by "blips" of that color on the image or display screen, would be that the pilot and/or traffic man could ascertain which planes were at the odd altitude and which at the even altitude. For traffic control reasons, aircraft have to be assigned definite altitudes to keep the airways free of congestion. Manifestly, there are many other commercial uses in which a polychrome polar coordinate tube could be utilized.

The preferred embodiment of the instant invention contemplates a polychrome polar coordinate cathode ray tube which comprises an evacuated envelope and an optically transparent electrically conducting target electrode disposed therewithin having each surface thereof covered with a fluorescent material, each fluorescent adapted to emit light of a different wave length when excited by an impinging beam of electrons. A conventional electron source disposed within the envelope is adapted to deliver a beam of electrons along a path toward the target electrode. Electrostatic means are provided to cause the beam to be rotated, preferably through 360°, and additional means are provided to bend the beam so as to cause it to travel radially outward adjacent one of the fluorescent coatings of the target. An electrostatic deflection means is provided to cause the beam to bend completely around the edge of the target electrode so the beam will travel along a path adjacent the other fluorescent coating of the target electrode. Finally, there is provided two sets of deflection means disposed in spaced relation from the fluorescent coatings of the target electrode, one set for each fluorescent coating. The deflection sets may be selectively energized to cause the beam to be deflected toward and impinge upon the desired fluorescent surface.

It will be obvious to those skilled in the art that if one of the fluorescent coatings is capable of emitting green light and the other red light, the resultant display will be in color.

Figure 2:
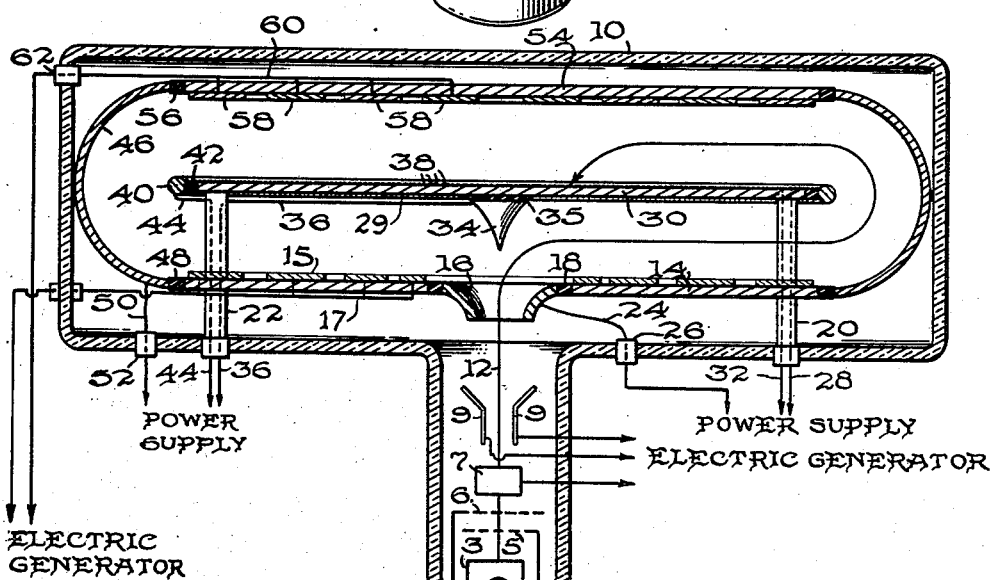

The specific features and advantages will be readily apparent when the following description is read in conjunction with the associated drawings in which:

Figure 1 is a partially cut-away perspective view of the cathode ray tube of the instant invention, Figure 2 is a sectional view of the tube showing various electrical connections schematically, and Figure 3 is a block diagram of a system incorporating the polar coordinate tube of the instant invention.

Referring to Figures 1 and 2, disposed within an evacuated envelope 10 there is arranged a heater or filament 1, a cathode 3, a control electrode 5, an accelerating electrode 6, a pair of horizontal deflection plates 7, and a pair of vertical deflection plates 9 which together comprise a conventional electron gun arrangement for producing a beam of electrons along a path. The horizontal deflection plates 7 and the vertical deflection plates 9 are suitably energized by an electric generator 8 as shown in Figure 3. The filament 1, the cathode 3, and the accelerating electrode 6 are suitably energized from a power supply 4 as shown in Figure 3.

An apertured non-conductive plate 14 is disposed within the enlarged portion of the tube 10 and positioned transversely with respect to the emergent electron beam 12. A plurality of annular electrostatic deflection electrodes 15 are fixed to the surface of the plate 14 and electrically connected to an electric generator 8, shown in Figure 3, by conductor 17 which passes through a vacuum seal 32 in the wall of the envelope 10. An annular electrode 16 is disposed within an aperture formed in the plate 14 and is insulatingly spaced from the innermost of the annular deflection electrodes 15 by an insulator collar 18. The electrode 16 is energized through an electrical conductor 24 which in turn is connected to a power supply 4, shown in Figure 3, outside the tube envelope through a vacuum-tight seal 26. The plate 14 is maintained in a fixed position within the tube envelope 10 by means of hollow insulating rods 20 and 22.

An optically transparent non-conducting target plate 30 is positioned within the envelope 10 in spaced relation from and substantially parallel to the plate 14. In order to maintain the spaced relation between the plate 30 and the plate 14, the plate 30 is disposed at the terminal portions of the insulating rods 20 and 22. The plate 30 is provided with fluorescent coatings 29 and 38 on the opposite surfaces thereof. For purposes of illustration, the fluorescent coating 29 may be formed of a phosphor material capable of emitting green light when struck by an impinging beam of electrons and the fluorescent coating 38 may be formed of a phosphor material which is capable of emitting red light when struck by an impinging beam of electrons. The fluorescent coating 29 is maintained at the desired positive potential with respect to the cathode potential of the electron gun through an electrical conductor 28 which passes to a power supply outside the tube through the hollow insulating rod 20. The fluorescent coating 38 is maintained at a positive potential with respect to the cathode potential of the electron gun through an electrical conductor 32 which passes to a power supply outside the tube wall through the hollow insulating rod 20.

An electrode 34 is mounted on the surface of the plate 30 on the surface thereof which is facing the electron beam source and is energized through a conductor 36 which in turn is connected to a power supply 4, as shown in Fig. 3, outside the tube envelope through the hollow portion of the insulating rod 22. An insulating member 35 is disposed intermediate the electrode 34 and the surface of the target plate 30 to suitably insulate the electrode 34.

An annular electrode 40 is affixed to the periphery of the plate 30 and insulated therefrom by an insulating annulus 42. The electrode 40 is energized from a power supply 4, as shown in Fig. 3, outside the tube envelope through an electrical conductor 44 which passes through the hollow portion of the insulating rod 22.

An annular electrode 46 is disposed within the tube envelope 10 and circumferentially spaced from the electrode 40. The electrode 46 is semi-circular in cross-section and concentric with the electrode 40. One of the free peripheral edges of the electrode 46 is insulatingly affixed to the peripheral edge of the plate 14 by an insulating annulus 48. Potential is applied to the electrode 46 through an electrical conductor 50 from a power supply 4, as shown in Fig. 3, outside the tube wall. The conductor 50 is adapted to pass through the tube wall through a vacuum-tight seal 52.

A transparent disc 54 is positioned within the envelope 10 in spaced relation from the plate 30 and has its peripheral edge affixed to the free peripheral edge of the electrode 46 by an insulating annulus 56. A plurality of annular optically transparent electrostatic deflection electrodes 58 are affixed to the surface of the transparent disc on the surface thereof facing the plate 30. Potential is applied to the electrodes 58 from an electric generator 8, as shown in Fig. 3, outside the tube wall through electrical conductors 60 which pass through a vacuum-tight seal 62 situated in the wall of the envelope 10.

Figure 3 shows in diagrammatic form a system which incorporates the polar coordinate tube of the instant invention. It will be noted that an incoming signal is received by an antenna and fed through an input stage 2 to the control grid 5 of the electron gun.

A power supply 4 is provided to supply to the various electrodes of the instant device through their respective electrical conductors. Also, it will be noted that a power supply 4 is adapted to energize the electric generator 8 which in turn is electrically coupled to the horizontal and vertical deflection plates 7 and 9, respectively, of the electron gun. Electric generator 8 is further adapted to supply the desired energization to the transparent deflection electrodes 58 (Fig. 2) through electrical conductors 60.

In operation, the electron beam 12 is formed and caused to pass through the electrostatic field established by the horizontal and vertical deflection plates 7 and 9, respectively. By applying suitable varying potentials to these deflection electrodes, a rotating electrostatic field is established which causes the electron beam 12 to rotate about its longitudinal axis. It will be readily discernible that the beam 12 could also be caused to rotate about its longitudinal axis by other means, such as for example, an electromagnetic means rotatably mounted around the neck of the envelope which, in the case of radar use, could be rotated in synchronism with the antenna.

Suitable potentials are impressed on the electrodes 16 and 34 thereby establishing electrostatic field conditions to cause the electron beam 12 to bend through substantially 90° and travel in a path radially outward therefrom. It will be discerned that the electrode 16 must have a potential impressed thereon which is positive with respect to the beam or the cathode potential and the potential impressed upon the electrode 34 must be negative with respect to the beam or cathode potential, thereby causing the beam to bend through substantially 90° and travel along a radial path intermediate the plate 14 and the plate 30.

For purposes of illustration, it will be assumed that the first signal to be displayed by the instant device is to be red, in which case, the beam 12 must bombard the fluorescent coating 38. A field-free region is established between the fluorescent coating 29 and the set of deflection electrodes 15, so that the beam 12 will not be affected by any spurious electrostatic fields which would interfere with the beam travel. In order to establish the desired field-free region, the potentials impressed on the set of deflection electrodes 15 must be substantially equal to the potential impressed on the fluorescent coating 29. Accordingly, the electron beam 12 will now travel radially outward away from the electrodes 16 and 34, between and substantially parallel to the plate 30 and the set of deflection electrodes 15.

The electrodes 40 and 46 cooperate together to form an electron lens arrangement adapted to bend or reflect the electron beam 12 through substantially 180° and cause the beam to travel along a path intermediate the fluorescent coating 38 on the target plate 30 and the set of deflection electrodes 58. A suitable negative potential with respect to the beam potential is applied to the electrode 46 and a likewise suitable positive potential with respect to the beam potential is applied to the electrode 40 to effect the desired beam bend or deflection. The energy and forward velocity of the electron beam 12 is sufficient to cause the beam to traverse the entire radius of the target plate 30 and due to the rotation effected thereon by the rotating electrostatic field, the beam will be caused to rotate or sweep through 360° in a plane parallel to that of the target. It will now be seen that the beam has been caused to bend and travel along a path which is intermediate the fluorescent coating 38 and the deflection set comprised of the electrodes 58. In order to cause the beam to be deflected toward and impinge upon the fluorescent coating 38, suitable one or ones of the deflection set 58 are selectively driven negative by an electric generator 8, shown diagrammatically in Fig. 3. As the beam 12 sees the negative field with respect to the cathode potential of the electron source established by the deflection electrodes 58, the beam will be deflected away from the deflection electrodes in a direction toward and into impingement with the fluorescent coating 38. The impinging electrons will cause the fluorescent material of this coating to become excited and give off a luminescent signal in the form of red light in the example presently under discussion. The resulting luminescence may then be effectively viewed from a point outside the tube 10 through the transparent deflection electrodes 58 and the transparent disc 54.

Next, it will be assumed that the signal to be displayed is to be green, in which case the beam must be caused to impinge on the fluorescent coating 29 which is capable of emitting green light. This procedure is accomplished in a manner similar to that explained with reference to the fluorescent coating 38. In this case, the electron beam 12, still under the influence of the rotating electrostatic field established by the horizontal and vertical deflection plates 7 and 9, respectively, of the electron gun, is caused to be deflected from its initial path by the electron lens comprised of the electrodes 16 and 34 and travel along a path which is intermediate the fluorescent coating 29 and the set of deflection electrodes 15. In order to cause the electron beam 12 to impinge on the fluorescent coating 29, certain one or ones of the deflection set comprised of the electrodes 15 must be driven negative with respect to the cathode potential of the electron gun thereby establishing a negative or repelling electrostatic field which will cause the beam to be bent toward and impinge on the fluorescent coating 29 which, upon electron bombardment, will exhibit a green luminescent signal. This green signal or light may be readily viewed from a point outside the tube wall through the transparent plate or disc 54, transparent deflection electrodes 58, and the transparent disc or plate 30.

It will be apparent to those skilled in the art that if the signals corresponding to the red and green information is received with rapidity, the spots where the electron beam impinges on the superimposed targets may exhibit a resultant visual signal of a color which is a blend of the colors exhibited by the individual target areas.

Assuming that a raster is desired of a solid or single color, the system may be energized in such a manner as to cause the beam to impinge only one of the fluorescent surfaces of the target plate 30 in which case the other fluorescent coating and associated deflection set would remain inoperative during this period. Let us assume, for example, that a red raster is desired. The electron beam will be caused to be delivered by the electron gun and deflected by the electrodes 16 and 34 and the electrodes 40 and 46 to the region intermediate the deflection plates 58 and the fluorescent coating 38, in the manner described hereinabove. In such case, a sequential signal is applied successively to each of the deflection electrodes 58 by the electric generator 8, as shown diagrammatically in Fig. 3. As the beam 12 reaches the proximity of the central portion of the fluorescent coating 38, a signal is applied to the innermost annular transparent electrode 58 which establishes a negative field with respect to the cathode potential of the electron source in the center region of the target and causes the beam to be deflected toward and impinge on the fluorescent coating 38. The impinging electrons will cause the fluorescent material thereof to become excited and give off the desired luminescent signal in the form of green light. Assuming that a negative potential is initially applied to the outermost of the deflection electrodes 58, the impinging electrons will exhibit an annulus of luminescence of a constant radius due to the 360° sweep of the beam. However, in actual practice, the potentials applied to the deflection electrodes are preferably successively or selectively applied to the deflection electrodes by an electric generator causing the electron beam to be deflected and impinge on radial portions of the target successively away from its center, thereby effecting excitation of the phosphor on substantially every portion of the fluorescent area of the coating 38. When complete scanning of the target has been accomplished, the deflection electrodes are recharged by auxiliary means so that the beam could once again travel to the center portion of the target and commence another scanning operation.

It must be understood that various modifications of the device will be apparent to those skilled in the art without avoiding the spirit of the instant invention. Such modifications, for example, contemplate the employment of a pair of electron guns each modulated by a signal representing a discrete color. Also, the color emitting properties of the electron sensitive material employed as the targets may be varied within the scope and spirit of the instant invention. These modifications are manifestly few in number, and are only set forth herein by way of example and it is not intended that the invention should be in any way limited thereby.

I claim:

1. An electron space discharge device comprising an annular target member having fluorescent material disposed thereon in a manner such that different areas thereof will emit light of different wave lengths upon excitation thereof by electron bombardment, an electron beam source means adapted to deliver a beam along a first path toward said target member, means for applying forces to the beam prior to registration with the target member causing the beam to be deflected along a second path adjacent one surface of said target, means for applying forces to the beam causing the beam to be deflected from its second path to a third path adjacent another surface of said target, and a set of deflection elements associated with each area of said target carrying the fluorescent material thereon for bending the beam into registration therewith.

2. An electron discharge device comprising at least two superposed targets each being capable of emitting light of a different color, a deflection set disposed in spaced relation with respect to each of said targets, means for delivering an electron beam along a path in a direction toward the first of said targets, means for deflecting the beam to a second path which extends between the said first target and its associated deflection set, means for deflecting the beam from the second path to a third path which extends between said second target and its associated deflection set and means for applying energizing signals to said deflection sets to selectively bend the beam into registration with the associated targets.

3. An electron discharge device comprising an optically transparent plate provided with a first and a second target on opposite surfaces thereof, each of said targets being capable of emitting light of different wave lengths when excited by an impinging beam of electrons, means for delivering a beam of electrons in a direction toward said first target, a deflection set disposed adjacent each of said targets, means for bending the beam in a direction toward the peripheral edge of said first target along a plane between said first target and its associated deflection set, means for bending the beam to a second plane between said second target and its associated deflection set and means for applying energizing signals to said deflection sets to bend the beam into registration with the associated targets.

4. An electron discharge device comprising at least two superposed fluorescent targets, a deflection set disposed in spaced relation with respect to each of said targets, means for delivering an electron beam along a path in a direction toward the first of said targets, means for deflecting the beam to a second path which extends between the said first target and its associated deflection set, and means for bending the beam from said first plane to a third path which extends between said second target and its associated deflection set.

5. In a polar coordinate cathode ray for exhibiting color display, the improvement comprising a pellucid plate provided with a first and a second target on opposite surfaces thereof, the first of said targets being capable of emitting light of one of the primary additive colors when excited by an impinging beam of electrons, and the second of said targets being capable of emitting light of another of the primary additive colors, means for delivering a beam of electrons in a direction toward said first target, a deflection set disposed adjacent each of said targets, means for bending the beam in a direction toward the peripheral edge of said first target along a plane between said first target and its associated deflection set, means for bending the beam from said first plane to a second plane between said second target and its associated deflection set and means for applying energizing signals to the different deflection sets to selectively bend the beam into registration with the different targets.

6. A cathode ray tube comprising at least two electron sensitive targets, a deflection set for each of said targets, each of which is disposed in spaced relation with respect to its associated target, means for delivering an electron beam along a first path which extends between the first target and its associated deflection set, means for deflecting the beam from said path at a point subsequent to its passage between its first target and its associated deflection set to a second path which extends between said second target and its associated deflection set and means for applying energizing signals to said deflection sets to bend the beam into registration with the associated targets.

7. A polar coordinate cathode ray tube capable of exhibiting information in color comprising at least two disc like electron sensitive targets, each of said targets being capable of emitting light of predetermined wave lengths of different values relative to one another, a set of annular deflection electrodes disposed adjacent each of said targets and in substantially concentric relation with respect thereto, and an electron source means for selectively delivering a beam of electrons between said targets and their associated deflection sets for deflection by said sets into registration with their associated targets.

8. A method of presenting a visual color signal on an electron sensitive target means comprising sequentially delivering a beam of electrons along a first path which lies in adjacent spaced and substantially parallel relation with a first surface of said electron sensitive target and applying deflecting forces to said beam to deflect same into registration with said first surface of said target, and thereafter delivering a beam along said first path, bending said beam from said first path to a second path which lies in adjacent spaced and substantially parallel relation with a second superposed surface of said target and applying deflecting forces to said beam to deflect same into registration with said second surface.

References Cited in the file of this patent
UNITED STATES PATENTS 2,705,765     Geer _____ Apr. 5, 1955